United States Patent [19]

Jannotta

[11] 4,275,382
[45] Jun. 23, 1981

[54] APPARATUS FOR MONITORING AND CONTROLLING VESSELS CONTAINING LIQUID

[76] Inventor: Louis J. Jannotta, 2800 E. Bernice Rd., Lansing, Ill. 60438

[21] Appl. No.: 58,508

[22] Filed: Jul. 18, 1979

[51] Int. Cl.³ .............. H04Q 1/00; G06F 15/00; G05B 15/00; G05D 9/00
[52] U.S. Cl. .................. 340/151; 364/509; 137/386
[58] Field of Search ........ 340/151, 147, 163; 364/509, 510; 222/26, 54, 67, 68; 137/386, 392, 551, 558; 73/292, 453

[56] References Cited

U.S. PATENT DOCUMENTS

| | | | |
|---|---|---|---|
| 3,350,687 | 10/1967 | Gabrielson et al. | 340/151 |
| 3,646,293 | 2/1972 | Howard | 340/623 |
| 3,653,262 | 4/1972 | Ehrenfried et al. | 73/292 |
| 3,927,800 | 12/1975 | Zinsmemeyer et al. | 222/26 |
| 4,090,248 | 5/1978 | Swanson et al. | 340/147 R |
| 4,101,056 | 7/1978 | Mattimoe et al. | 222/26 |

Primary Examiner—Donald J. Yusko

[57] ABSTRACT

Apparatus for determining the level of liquid in a vessel, e.g., storage tank comprises a plurality of indicators at varying heights along the vessel acting to indicate the presence of the liquid level at a given height; a controller to receive signals from the indicators and translate such signals into liquid level height; a memory device to store information from the controller for future use; and a display system to receive signals from the controller and provide a visual display of the liquid level height in the vessel. Preferably, the apparatus also includes a central monitoring station where signals from a plurality of controllers are received so that the liquid levels in a plurality of vessels can be displayed.

In additional preferred embodiments, the controller can collect information regarding vessel liquid temperature and/or the status of pumps, valves and the like which can change the liquid level in the vessel. A further embodiment is disclosed in which the controller sends out signals to alter the status of one or more of such pumps, valves and the like.

17 Claims, 9 Drawing Figures

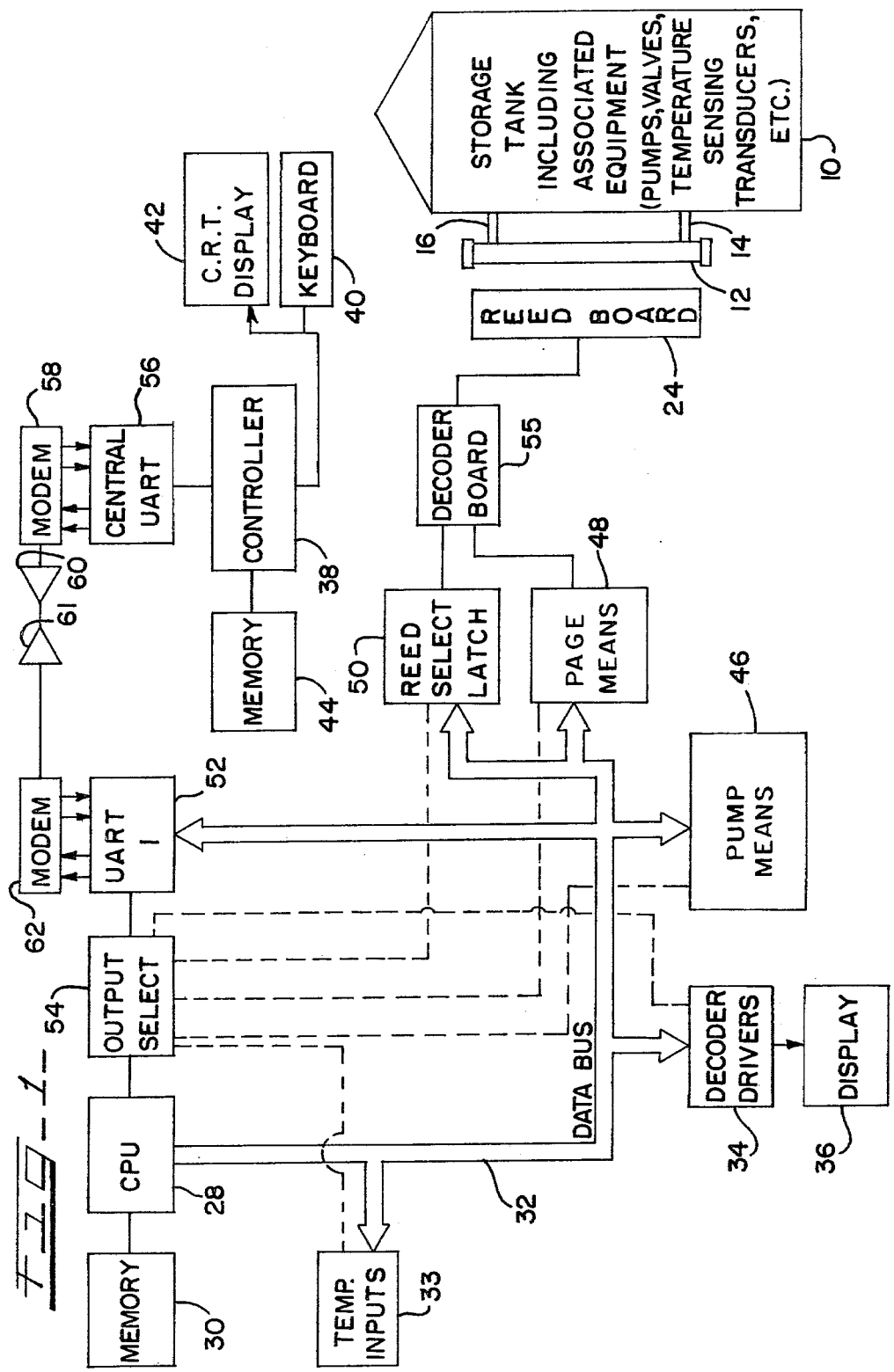

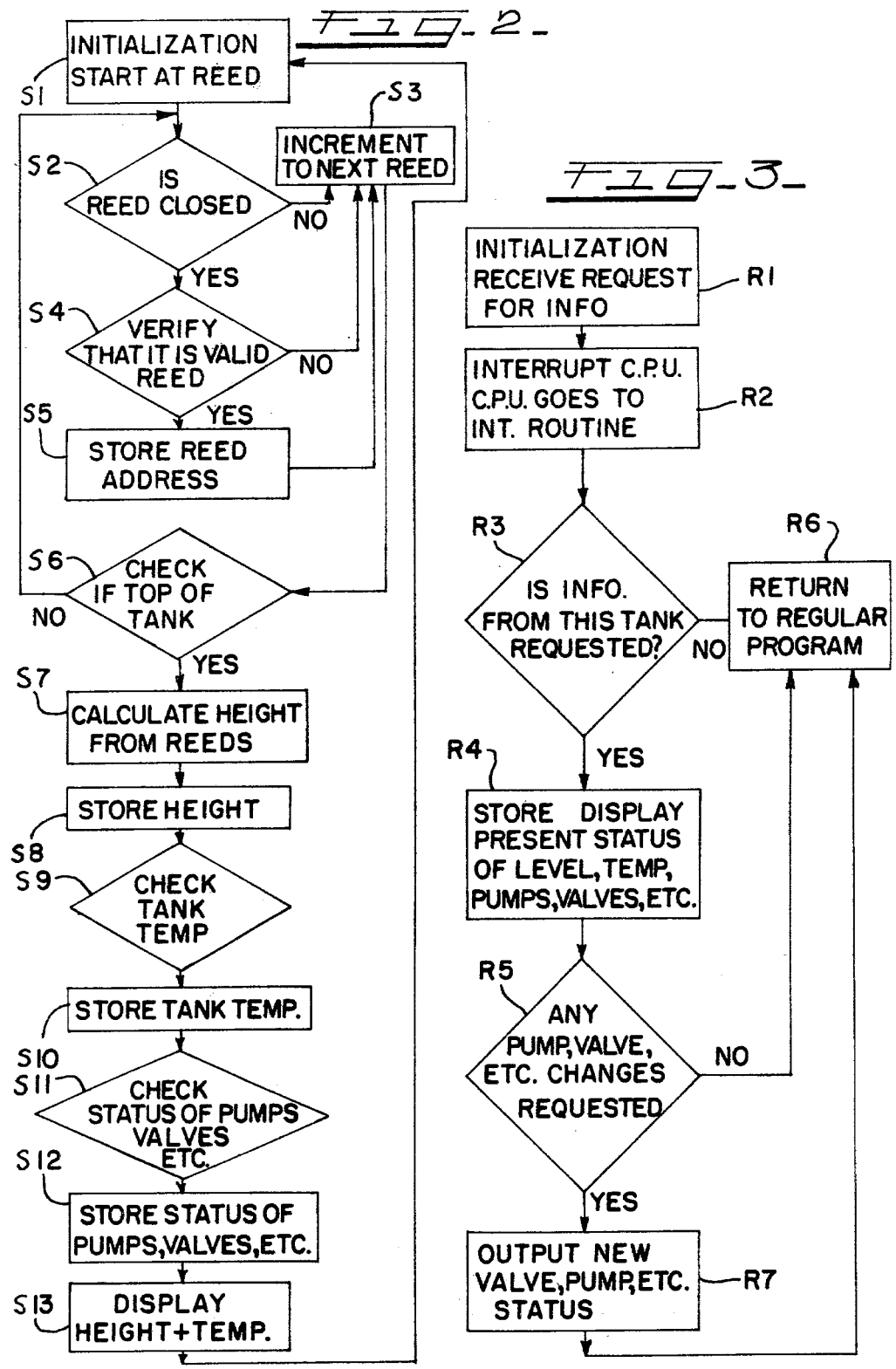

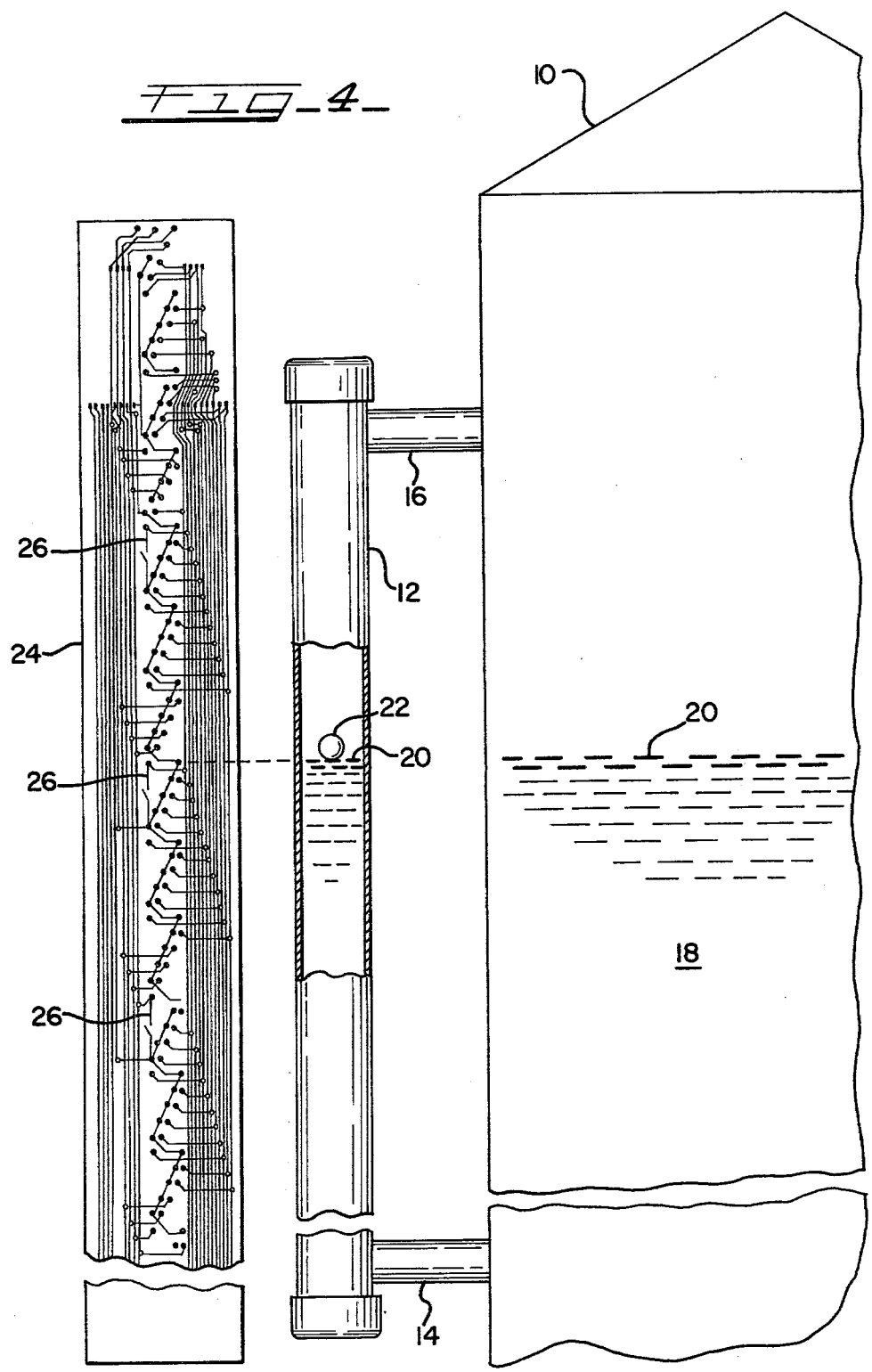

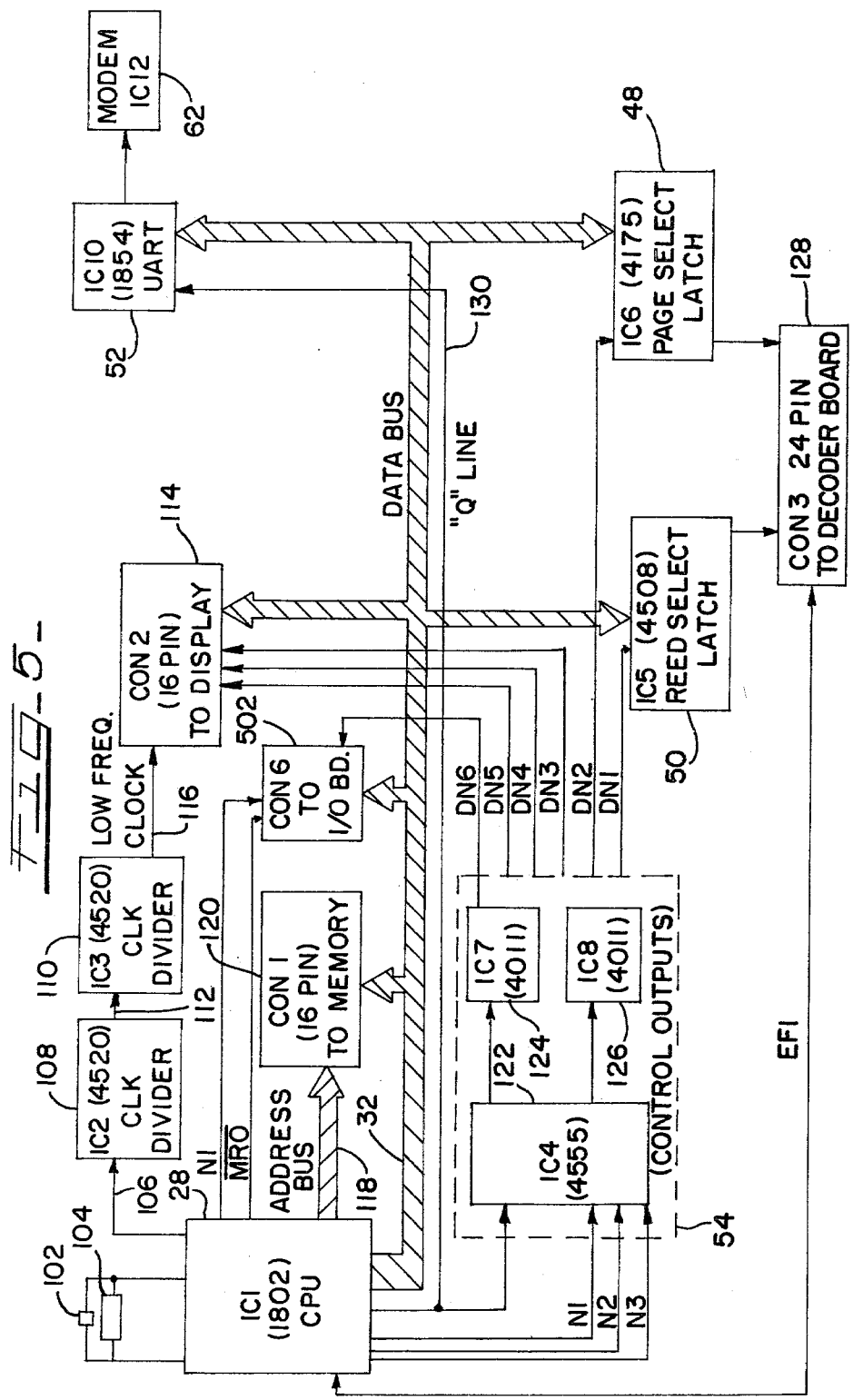

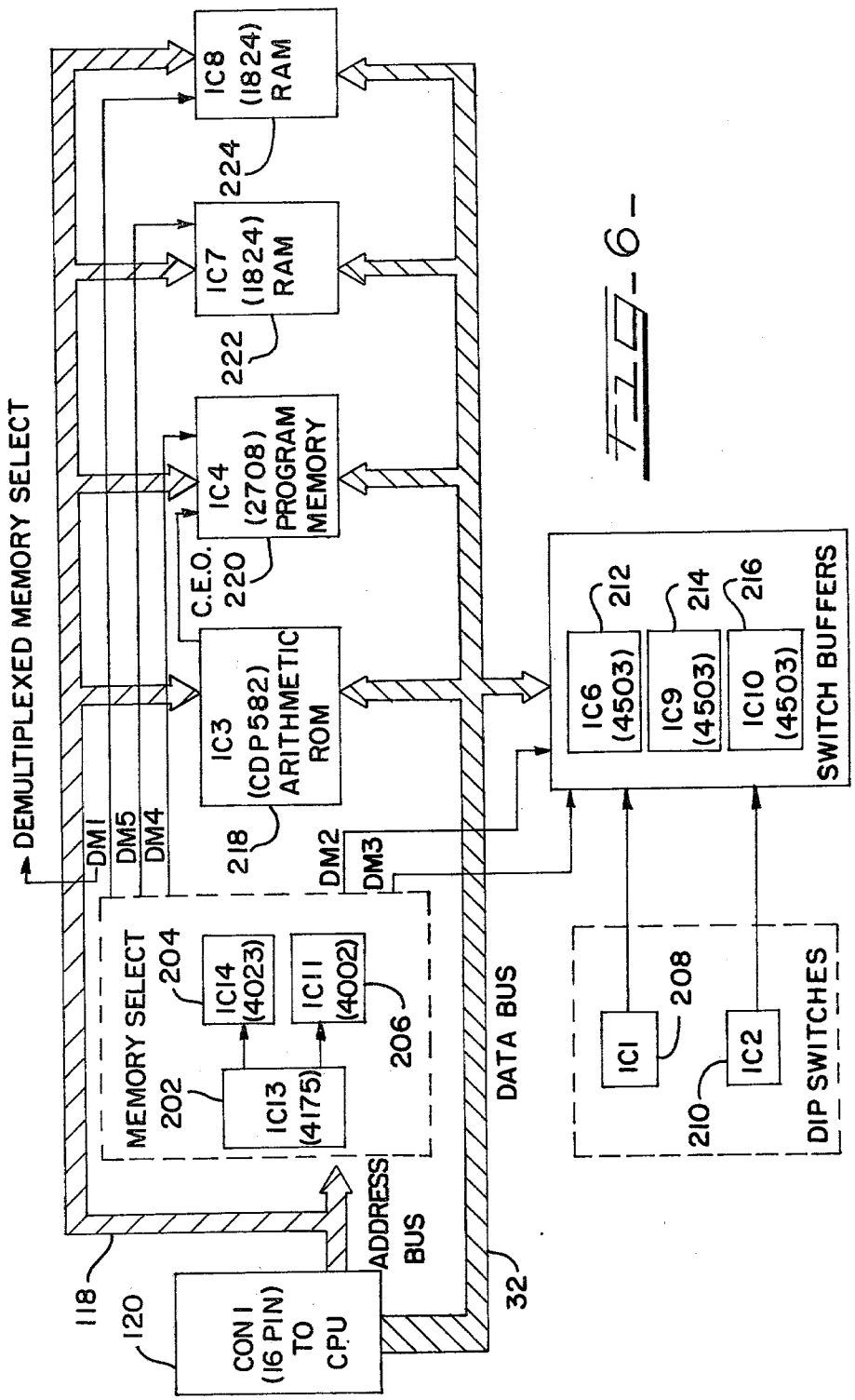
FIG-6-

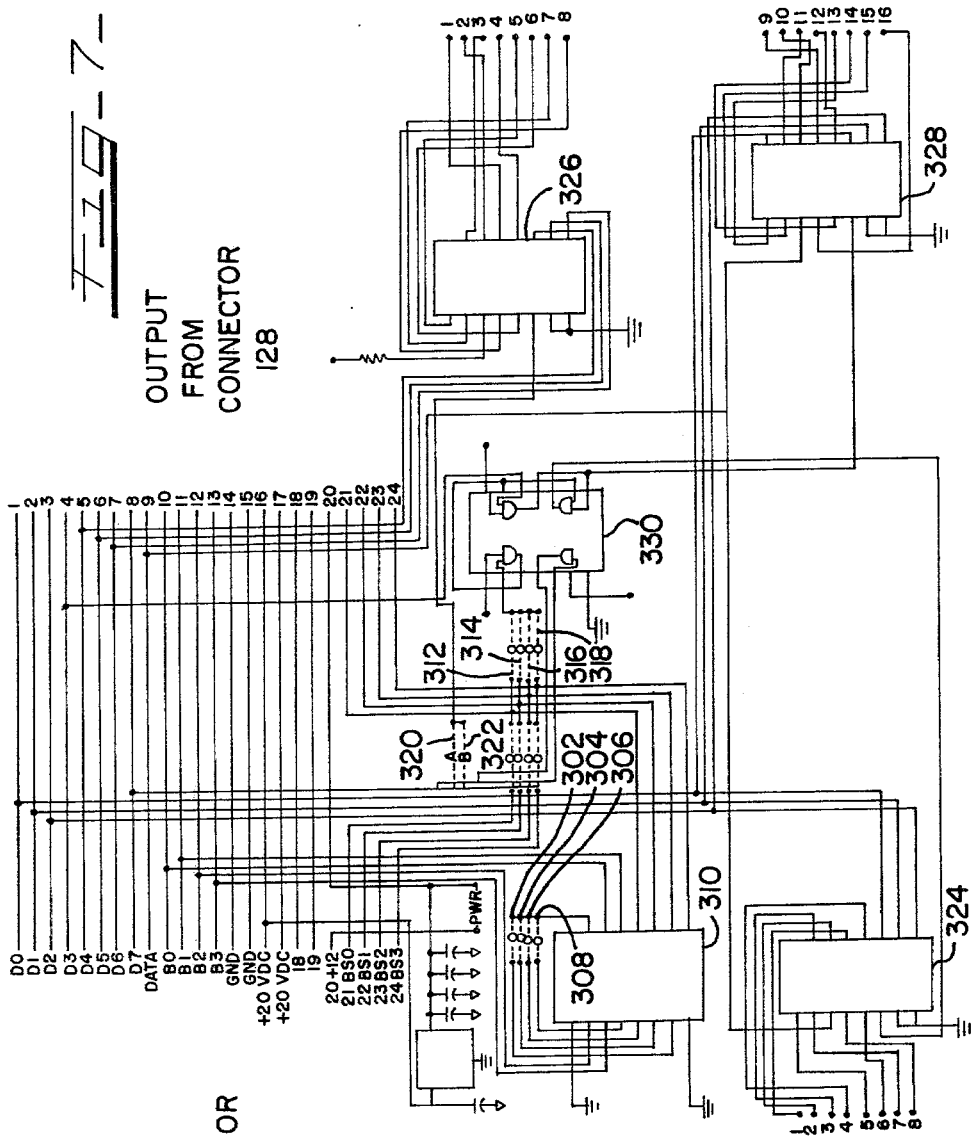

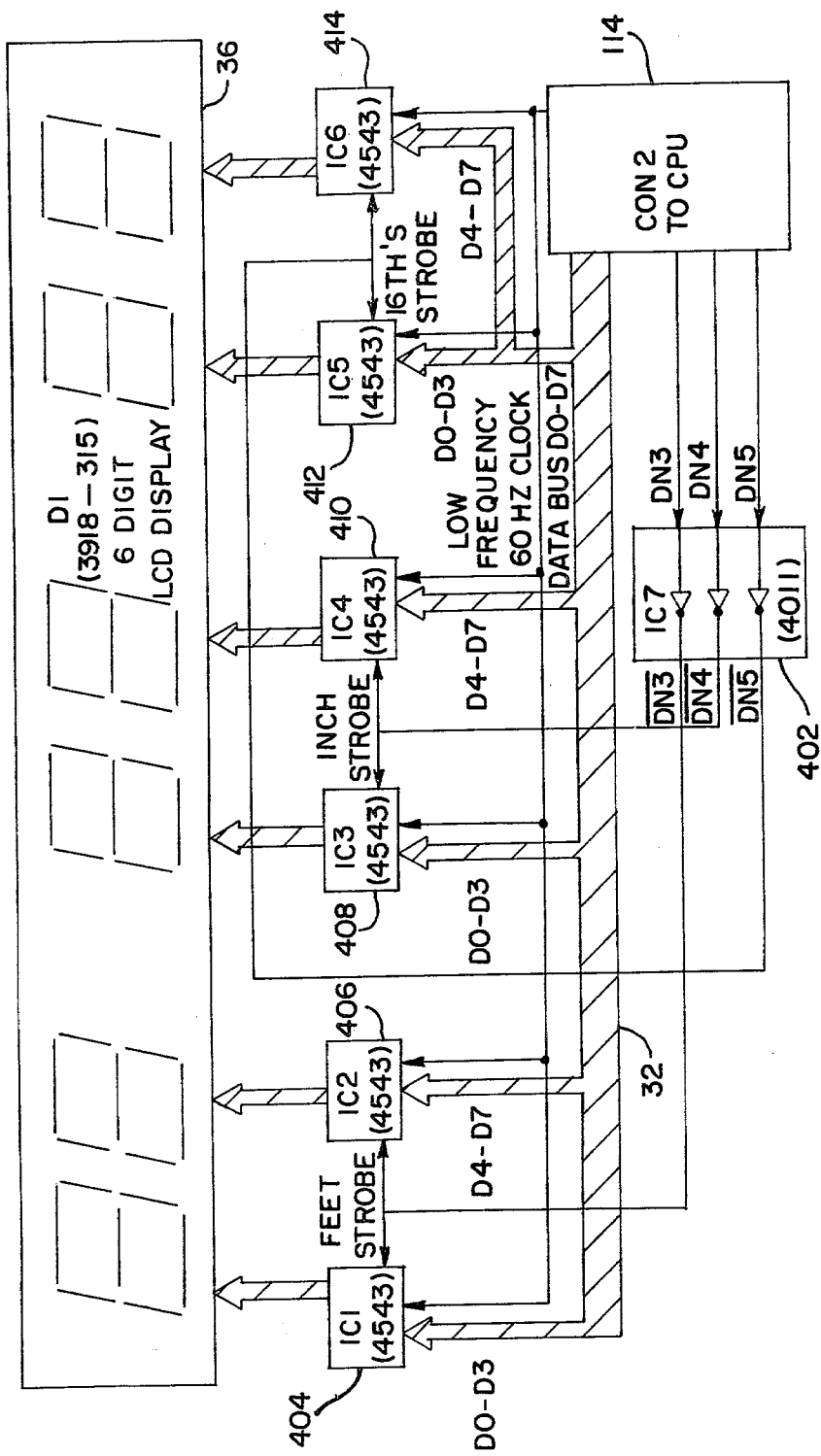

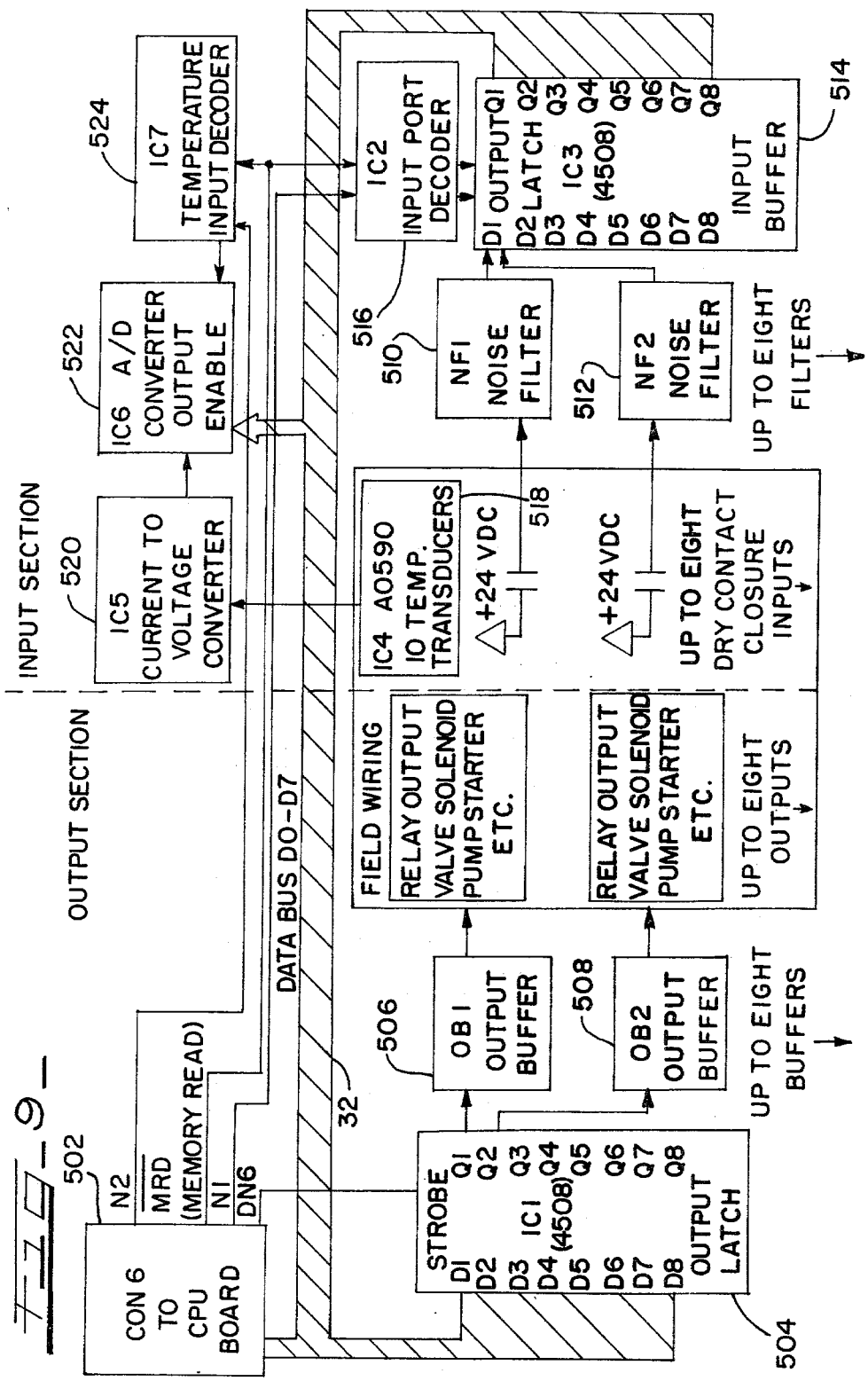

APPARATUS FOR MONITORING AND CONTROLLING VESSELS CONTAINING LIQUID

This invention relates to improved apparatus for monitoring and/or controlling vessels which contain liquid, e.g., liquid storage tanks. More particularly, the present invention relates to an improved system for monitoring and/or controlling the liquid level in a vessel containing liquid and preferably monitoring the liquid temperature inside a vessel containing liquid.

A great many devices have been suggested and used to monitor the level of liquid inside a vessel, e.g., liquid storage tank. The following list of U.S. patents represent just a sampling of such devices: U.S. Pat. Nos. 246,718; 705,421; 3,505,869; 3,626,399; 3,646,293; 3,886,518; and 3,983,549.

Many modern day applications requiring storage tank operation involve obtaining information from a great number of tanks. For example, fuel tanks are often clustered in what are called "tank farms" with each "farm" having from about ten (10) to about 100 or more tanks. Good tank management requires that the amount or level of liquid in each tank be closely monitored. Collecting liquid level information from a plurality of storage tanks manually, i.e., having one or more persons read individual tank level gages, is tedious, time consuming, and, because of the time lag involved in reporting results to a central location, often provides obsolete information. A more efficient way to monitor, and preferably control, the status, e.g., liquid level and liquid temperature, in a storage tank is clearly desirable.

Therefore, one object of the present invention is to provide an improved apparatus for monitoring the status of a vessel containing liquid and its associated components.

Another object of this invention is to provide an improved apparatus for monitoring the level of liquid in a vessel containing liquid.

A further object of this invention is to provide an improved apparatus for controlling the level of liquid in a vessel containing liquid.

A still further object of the present invention is to provide an improved apparatus for monitoring the temperature of the liquid in a vessel containing liquid.

An additional object of this invention is to provide an improved apparatus for monitoring the status of a plurality of vessels containing liquid, and associated components, from a central location.

Another object of this invention is to provide an improved apparatus for monitoring (and controlling) the level of liquid in a plurality of vessels containing liquid from a central location. These and other objects and advantages of the present invention will become apparent hereinafter.

An improved apparatus for determining the level of liquid in a vessel containing liquid has now been discovered. The present system, in one embodiment, involves a plurality of indicator means which are located at varying points along the height of the vessel. These indicators are capable of acting to indicate the presence of liquid at a predetermined, or given, level within the vessel, e.g., at a level along the height of the vessel corresponding to the position of one of the multitude of indicators. A control means, or central processing unit (CPU), is associated with these indicators and acts to periodically, and preferably systematically, send first signals to each of the indicators to determine which, if any, given indicator given a positive indication of the presence of liquid at the corresponding level in the vessel. The control means further acts to receive second signals from each of the indicators indicating the presence or absence of liquid at the level of such individual indicator. These second signals are translatable by the control means into third signals which represent the liquid height, e.g., in feet and inches, in the vessel. A memory means in association with the control means is provided to receive and store for future use the second and/or third signals indicating the liquid height in the vessel. A display device is provided in association with the control means. This display means acts to periodically receive third signals from the control means or from the memory, e.g., through or in response to the control means, to provide a visual display of the liquid height in the vessel.

The embodiment of the present invention described above provides substantially continuous, reliable, up-to-date liquid level information on a vessel containing liquid. When, as is preferred, each of the indicator means comprises a magnetic reed switch activated by a magnetic float at or near the liquid surface and the control means is a microprocessor, the system is especially effective. In this embodiment, the system is compact enough to be located at the vessel and operates without human intervention. Thus, the microprocessor is instructed, e.g., programmed, to act as the control means described above and an up-to-date visual representation of the liquid level is provided by the display means.

The present invention is capable of monitoring and/or controlling the operation of any vessel which contains and/or holds (stores) a quantity of liquid. Examples of such vessels include liquid storage tanks, processing vessels such as distillation column reboilers, and the like. The present system is particularly applicable to liquid storage tanks. Reference is made hereinafter to the use of the present apparatus in conjunction with one or more liquid storage tanks; however it should be understood that any vessel containing liquid may be monitored and/or controlled.

In a preferred embodiment, the present apparatus includes a central monitoring means in association with the control means, and preferably in association with a plurality of control means from a plurality of storage tanks. Such central monitoring station is capable of receiving third signals from a plurality of control means and providing a visual display of the height of the liquid level in a plurality of liquid storage tanks. In this aspect, the present invention preferably involves a plurality of storage tanks each equipped (or associated) with indicator means, control means, memory means and display means, and the plurality of control means are associated with a single central monitoring station. This system, which provides central reporting of liquid level information from a plurality of tanks, e.g., a whole "tank farm", is relatively compact and labor saving, and promotes efficient and safe storage tank utilization.

In most, if not all, situations, liquid storage tanks are equipped with one or more pumps (inlet and outlet pumps), and/or valves in inlet and outlet lines and the like which are used to control the amount of liquid entering into or exiting from the storage tank. Since, in effect, the status of these tank components are capable of changing the amount of liquid and the level of liquid in the tank, they are here referred to generically as "level change means".

In another aspect in which the storage tank is equipped with at least one of such level change means, the present invention involves indicator means and control means, as described above, in which the control means is capable of sending forth signals to the level change means. These signals control the level change means so that the liquid level in the tank is maintained within or adjusted to a predetermined range. Controlling a level change means may involve, for example, opening or closing a valve and/or causing more or less liquid to flow through a pump. These fourth signals are normally sent by the control means in response to the second signals received from the indicator means, which indicate the presence of liquid at a given level within the tank. The control means is also capable of periodically receiving fifth signals from the level change means which are translatable by the control means into sixth signals which represent the status of the level change means. The memory, associated with the control means, acts to receive and store for future use the fifth and/or sixth signals. This embodiment of the present apparatus provides an improved system for actually controlling the amount or level of liquid in a storage tank. The control means, e.g., microprocessor, is instructed or programmed as to the liquid level range to be maintained and controls the status of the level change means accordingly to achieve a level within this range. Under normal conditions, such liquid level control can be achieved with no human intervention and little, if any, continuing human support, e.g., monitoring.

Of course, the central monitoring station, described above, can be adapted to receive sixth signals from a plurality of control means and provide a visual display of the status of the level change means of a plurality of storage tanks.

One additional and preferred feature of this aspect of the present invention involves the central monitoring means. Thus, in this preferred embodiment, the central monitoring means includes an override means which is capable of acting in response to manual instruction to send seventh signals to the control means. The control means, in turn, in response to such seventh signals, sends fourth signals to the level change means to alter the status of this level change means. For example, the central monitoring station may include keyboard means or the like which will allow a human operator to manually instruct the control means to increase the liquid flow through a discharge pump in response to an abnormally high liquid level inside the tank. In other words, this override mechanism provides a system whereby a human monitor can act through the present apparatus to alleviate an unusual and potentially dangerous situation.

A still further aspect of the present invention is directed to liquid storage tanks equipped with temperature measuring means, e.g., conventional electronic temperature sensing transducer, which allow the temperature of the liquid inside the storage tank to be measured. It has been found that the present control means can be conveniently adapted to periodically request and receive first temperature signals from the temperature measuring means. These first temperature signals are translatable by the control means into second temperature signals which represent the temperature of the liquid in the storage tank. In this embodiment, the memory means acts to receive and store first and/or second temperature signals and the present display means is capable of providing a visual display of the liquid temperature inside the storage tank.

The central monitoring means may be adapted to receive second temperature signals from a plurality of control means and provide a visual display of the liquid temperature inside a plurality of liquid storage tanks.

These and other aspects and advantages of the present invention are set forth in the following detailed description and claims, particularly when considered in conjunction with the accompanying drawings in which like parts bear like reference numerals. In the drawings:

FIG. 1 is an overall schematic diagram showing one embodiment of the present apparatus.

FIG. 2 is a flow diagram of the preferred operation of the CPU in FIG. 1.

FIG. 3 is a flow diagram of the preferred operation of the controller in FIG. 1.

FIG. 4 is a schematic illustration showing the reed switches of FIG. 1 in relation to the liquid storage tank.

FIG. 5 is a detailed schematic diagram of one portion of the system shown in FIG. 1 illustrating the functioning of the CPU.

FIG. 6 is a detailed schematic diagram of another portion of the system shown in FIG. 1 illustrating the functioning of the memory associated with the CPU.

FIG. 7 is a detailed schematic diagram of a further portion of the system shown in FIG. 1 illustrating the functioning of the decoder board.

FIG. 8 is a detailed schematic diagram of yet another portion of the system shown in FIG. 1 illustrating the functioning of the display sub-system.

FIG. 9 is a detailed systematic diagram of a still further portion of the system shown in FIG. 1 illustrating the functioning of such system to monitor and/or control the status of valves, pumps, etc. and to monitor liquid temperature.

Referring now to the schematic diagram shown in FIG. 1, liquid storage tank 10 is shown with tube 12 attached thereto. Tube 12 is attached to tank 10 by hollow pipes 14 and 16 which allow fluid communication between tank 10 and tube 12. Thus, the liquid level in tank 10 is the same as the liquid level in tube 12.

Tank 10 is shown as being equipped with various conventional components. For example, tank 10 includes a liquid inlet pump and a liquid discharge pump as well as valves associated with each of these pumps. These valves and/or pumps can be electrically controlled, as will be discussed in detail hereinafter, to control the level of liquid in the tank 10. One or more temperature sensing transducers are also included with tank 10 to allow the temperature of the stored liquid to be determined.

FIG. 4 shows tank 10 and tube 12 in more detail. Consistent with the laws of physics, liquid 18 is shown at the same level 20 in both tank 10 and tube 12. Magnetic float 22, e.g., comprising magnetic material in a protective shell, floats at or near liquid level 20 in tube 12. In close proximity to tube 12 is reed board 24 which includes a multitude of individual, normally open magnetic reed switches 26. (For purposes of clarity, only a limited number of switches 26 are actually shown in FIG. 4.) Reed switches 26 are located on reed board 24 in matrix array. As level 20 moves up and down tank 10 and tube 12, magnetic float 22 also moves and emits magnetic forces which temporarily close the individual reed switches near the level of the float 22. The float 22 is sized to emit sufficient magnetic force and the reed switches 26 are located on reed board 24 and are spaced apart so that float 22 is capable of influencing five (5) reed switches 26 to close at any one time.

Referring again to FIG. 1, a microprocessor 28 acts as a central processing unit (CPU) to request, receive, display, deliver and coordinate various information as set forth below. One function that microprocessor 28 performs is to systematically check each one of reed switches 26 to determine whether any given reed switch 26 is closed. Other functions which microprocessor 28 performs include checking on the temperature of the liquid 18 in tank 10, checking on the status of the pumps and/or valves associated with tank 10, and coordinating the information received from the reed switches 26 with the information from the pumps and/or valves to change the status of the pumps and/or valves, if necessary, to control the level 20 of liquid 18 in tank 10 within a safe range. Microprocessor 28 has other substantial functions which will be made clear hereinafter.

FIG. 2 shows, in diagram form, one preferred scheme of operation of the microprocessor 28. As will be recognized by those skilled in the art, microprocessor 28 is, in effect, a miniature computer and that each of the functions of microprocessor 28 require instructions to be given to microprocessor 28. In view of the present specification, such instructions, or programming, needed to implement the present invention are believed to be within the ordinary skill of the art. Therefore, detailed computer programs need not be set forth herein.

In FIG. 2, the operation of microprocessor 28 normally starts at step S1, at which point microprocessor 28 requests information on the status, i.e., open or closed, of the reed switch 26 corresponding to the lowest level 20 of liquid 18 in tank 10, e.g., the bottom of tank 10. In essence, the status of any individual reed switch 26 is checked by determining the existence or non-existence of an electrical circuit across the individual reed switch 26 being checked. An electrical circuit across a reed switch 26 says that that switch 26 is closed and is an indication that the level 20 of liquid 18 in tank 10 is at or near the level corresponding to the position of the reed switch 26 being checked. Conversely, if there is no circuit across the switch 26 being checked, that switch 26 is open and that, in turn, provides an indication that the level 20 of liquid 18 in tank 10 is not at or near the level of the switch being checked. In any event, microprocessor 28 starts at step S1 to check the status of the lowest reed switch 26.

At step S2, microprocessor 28 receives information regarding the status of an individual reed switch 26 and reacts according to the status as determined. Thus, if the reed switch 26 being checked is not closed, i.e., is open, then microprocessor 28 proceeds to step S3 which involves requesting status information from the reed switch 26 closest to, but higher than, the switch 26 most recently checked. In other words, if the reed switch 26 being checked is open, the microprocessor 28 will move to check the status of the next higher reed switch 26. This sequence of steps S2-S3 continues until one reed switch 26 is determined to be closed. From step S3, microprocessor 28 moves to step S6 to inquire as to whether the highest reed switch 26 has been checked. If not, microprocessor 28 returns to step S2 to check the higher reed switch 26.

At this point, the microprocessor 28 moves to step S4 to follow a procedure to verify whether the reed switch 26 indicated as being closed in step S2 is a true indication of the height of the level 20 of liquid 18 in tank 10. Many verification procedures are possible and any one, or even more, can be programmed into microprocessor 28. One verification procedure which has been found to be particularly effective is to check the status of the two closest reed switches 26 both above and below the reed switch 26 first indicated as being closed. If two or more of these four switches 26 are determined to be closed, the height of the reed switch 26 first determined to be closed is taken as a valid indication of the level 20 of liquid 18 in tank 10. This procedure is advantageous because it acknowledges the fact that one or more than one of the reed switches 26 attached to reed board 24 may become disabled, in the open or closed position. Thus, three close together reed switches 26 must be closed simultaneously before a valid indication of the level 20 is given. Further, this procedure reduces the amount of maintenance required on the reed switches 26 since a substantial number of widely scattered reed switches 26 may be disabled without causing erroneous indications of the level 20.

In any event, if step S4 does not verify that the closed reed switch 26 is a true indication of level 20, microprocessor 28 returns to step S3 to check the status of the next higher reed switch 26. However, if the closed reed switch 26 is verified as a true indication of the height of level 20, microprocessor 28 moves to step S5 to store the identity, or address, of this closed reed switch 26 in memory 30. Memory 30 (see FIG. 1), which is associated with microprocessor 28, may involve conventional electronic equipment used to store information for retrieval and future use. The individual reed switches 26 may be identified by number, e.g., the lowest being one (1), the next two (2) and so forth.

After the address of the closed reed switch 26 is stored, microprocessor 28 moves to step S3 to increment to the next higher reed switch address. Microprocessor 28 moves to step S6 to inquire if the highest reed switch 26, e.g., at the top of tank 10, has been checked. If not, microprocessor 28 returns to step S2 to continue checking additional higher reed switches 26. If all the reed switches have been checked, the microprocessor 28 moves to step S7 to calculate the height, e.g., in feet and inches, of level 20 of liquid 18 in tank 10 from the addresses of the closed reed switches 26 in memory 30. Only the addresses of reed switches 26 which are verified as a true indication of the level 20 are stored, thus reducing substantially the size and cost of memory 30. If more than one valid indication of the level 20 is stored, the microprocessor 28 might be instructed to provide an audial or visual signal, e.g., to a human operator, to warn of this condition. For example, maintenance of the reed switches 26 may be required.

After the height of level 20 is calculated, microprocessor 28 moves to step S8 at which point such height is stored in memory 30 for future use.

The microprocessor 28 next moves to step S9 and requests and receives information from the temperature indicating device or devices, e.g., temperature sensing transducer, in the liquid 18 in tank 10. This information, e.g., electrical current and/or voltage, is requested and received via data bus 32 and is translated by the microprocessor into the temperature, e.g., in °F., of the liquid 18. In FIG. 1, liquid temperature information is shown being requested and received by microprocessor 28 via data bus 32 schematically at temperature input 33. This temperature is stored for future use in memory 30 by microprocessor 28 at step S10.

This microprocessor 28, at step S11, requests and receives information regarding the status of one or more pumps, valves and the like, which control the amount of liquid 18 entering or leaving tank 10 and, therefore, control level 20. For example a liquid discharge pump may be deactivated and/or a valve in the liquid discharge line from tank 10 may be closed and completely restricting liquid flow through such line. Of course, the discharge pump and valve may be cooperating to allow liquid 18 to leave tank 10. Conversely, one or more inlet pumps and valves may work to restrict all liquid 18 from entering tank 10 or to permit such liquid 18 to flow into tank 10. In any event, microprocessor 28 receives information regarding the status of such pumps, valves and the like and acts, in step S12, to store such status information in memory 30 for future use.

One further step taken during the regular or normal operation of microprocessor 28 is S13 in which microprocessor 28 retrieves the information stored in memory 30 regarding the height of level 20 in tank 10 and the temperature of liquid 18 in tank 10. This information, as shown in FIG. 1, is transmitted as binary coded (BC) signals from microprocessor 28 via data bus 32 to conventional decoder-driver device 34 and, from there, to a conventional display unit 36 where the liquid height and temperature are visually displayed. The decoder-driver device acts in a conventional manner to decode the BC signals from microprocessor 28 into signals which activate the proper elements or segments in the display unit 36. In other words, the device 34 and unit 36 translate the BC signals from the microprocessor 28 and data bus 32 into a visual presentation of the height and temperature of liquid 18 in tank 10.

After step S13 is completed, microprocessor 28 returns to step S1 and the normal or regular operation is repeated.

One additional feature of the present system is best understood by considering FIGS. 1, 2 and 3 together. In many instances, it is desirable to transmit and display information from a plurality of individual liquid storage tanks, such as tank 10, to a central location where the status of such tank can be monitored and even controlled.

Central controller 38, see FIG. 1, interacts with at least one, and preferably a plurality of, microprocessor 28 to request, receive, display, deliver and coordinate various information as set forth below. Like microprocessor 28, central controller 38 preferably embodies a conventional electronic microprocessor or minicomputer and is instructed to perform functions, as noted below, by programs and/or other software derived by conventional techniques.

FIG. 3 is a flow diagram which details certain functions of central controller 38 and when viewed with FIG. 2, illustrates the interaction between microprocessor 28 and central controller 38. At step R1, central controller 38 is instructed that information regarding a certain tank, or group of tanks, is needed. Such instruction may result from a routine, periodic check of the status of a given tank, say tank 10, which is programmed into central controller 38. On the other hand, central controller 38 is in communication with and responsive to manually operated keyboard 40. Thus, the human operator, by properly manipulating keyboard 40, can override the programmed routine of central controller 38 and request information on the status of any specific tank or tanks at any time the operator desires.

Once a request for information is received, at step R1, central controller 38 moves to step R2 at which point the central controller 38 interrupts one of the microprocessors, such as microprocessor 28, from which it periodically requests and receives information. The interaction between central controller 38 and microprocessor 28 causes microprocessor 28 to interrupt its normal operation to communicate with central controller 38. At step R3, microprocessor 28, in its interrupt mode, communicates with central controller 38 to determine if central controller 38 is seeking information regarding tank 10. For example, microprocessor 28 may be identified by a number. If the instructions from central controller 38 include the number, information regarding tank 10 is being sought from microprocessor 28. If so, microprocessor 28 would go into a conventional transmit subroutine to provide the requested information to central controller 3. If no such information is being sought, microprocessor 28 continues in its regular or normal operation, as discussed above, and central controller 38 identifies another microprocessor from which to obtain the requested information.

However, if central controller 38 is seeking information from tank 10, microprocessor 28 retrieves such current or present information regarding height and temperature of liquid 18 in tank 10, and present status of pumps, valves and the like from memory 30 and transmits such information to central controller 38. This information which is sent, in step R4, is passed to central controller 38 from which it is sent for display on a cathode ray tube (CRT) display unit 42 and also to memory 44, associated with central controller 38, for storage for future use. Information from more than one tank can be displayed on the CRT display unit 42. As noted above, the human operator can ask for information from any tank to be displayed on CRT display unit 42 at any time simply by keying in the proper instructions to central controller 38 at keyboard 40. Memory 44 and CRT display unit 42 are conventional components and, therefore, will not be described in detail.

Once the information from microprocessor 28 is displayed on the CRT display unit 42, the human operator is given an opportunity, at step R5 to request changes in the status of the pumps, valves and the like to, for example, change the level 20 of liquid 18 in tank 10, as desired. Such changes may be requested via keyboard 40. If no requests for changes in the status of such pumps, valves and the like are made, either by the human operator or by the central controller 38 through a normal programmed change in the status of such pumps, valves and the like, microprocessor 28 is allowed to return to its normal operation, shown in FIG. 3 as step R6. On the other hand, if such changes re requested, central controller 38, at step R7, communicates such changes to microprocessor 28 which, in turn, sends signals via data bus 32 to valve and pump control mechanisms, shown schematically in FIG. 1 as 46, to implement such requested changes. For example, if the discharge pump from tank 10 is "off" and the human operator wants it "on", he simply uses keyboard 40 to key his instructions to central controller 38 which, in turn, communicates with microprocessor 28 which sends a signal via data bus 32 to mechanism 46 to activate the discharge pump. In this manner, the present system not only monitors the status of one or more storage tanks, but also acts to control the tanks' operations.

After the change, or changes in status of the pumps, valves and the like are implemented, microprocessor 28 is allowed to return to normal or regular operation, e.g., as in step S2. Central controller 38 proceeds to gather information from other liquid storage tanks. Although only one microprocessor 28 and storage tank 10 are shown in the Figures, it is clear, and should be emphasized, that the present central controller 38 and associated equipment is preferably utilized to monitor and control the operation of a plurality of storage tanks.

FIG. 1 most clearly shows the interaction of the components discussed above. Microprocessor 28 is seen linked by data bus 32 to temperature inputs 33, decoder-driver device 34, valve and pump control mechanisms 46, page select latch 48, reed select system 50 and first universal asynchronous receiver-transmitter (UART I) 52. The functioning of page select latch 48, reed select latch 50 and UART I 52 will be discussed in detail hereinafter. Output select component 54, discussed in detail below, acts in cooperation with microprocessor 28 so that the microprocessor 28 directs signals to and-/or receives signals from, via data bus 32, only a limited number of the components linked to microprocessor 28 by data bus 32 at any one time.

The page select latch 48 and reed select latch 50 function as follows. In steps S1 to S6, microprocessor 28 is programmed to systematically check a large number of reed switches 26 located in matrix array on reed board 24. In order to check the status of an individual reed switch 26, microprocessor 28 sends out BC signals to both the page select latch 48 and the reed select latch 50 via data bus 32.

A "page" of reed switches 26 includes a plurality of "groups", e.g., two (2) "groups", of reed switches 26 which, in turn each include a plurality, e.g., 128, individual reed switches 26. The page select latch 48 and reed select latch 50 act to hold the BC signals from the microprocessor 28 for a period of time, in microseconds, to allow the system to "settle" (and avoid erroneous readings) before checking individual reed switches 26. As will be discussed hereinafter, the BC signals from microprocessor 28 are translated to determine which "page" of reed switches 26 is to be checked.

Once the proper "page" of reed switches 26 has been determined, the BC signals from microprocessor 28 are further translated to determine which "group" of reed switches 26 is to be checked and then, within that "group", which individual reed switch 26 is to be tested. In short, decoder board 55 acts to translate BC signals from microprocessor 28 to ultimately attempt to pass an electrical potential across the individual reed switch 26 to be tested.

Microprocessor 28 and central controller 38 communicate as follows. When central controller 38 is instructed to request information from or deliver information to microprocessor 28, central controller 38 passes such coded, e.g., BC, signals to central universal asynchronous receiver-transmitter (central UART) 56 which, in turn, passes such signals to central modem 58. Central modem 58 converts the signals, for transmission over relatively long distances, e.g., from the central control room to individual tanks, such as tank 10, into frequency modulated signals. Such signals are passed through line driver component 60 which acts to amplify the signal, if necessary. The signal reaches second modem 62 where it is reconverted into a digital modulated signal which is passed to UART I 52. The signals, or information, from UART I 52 are provided via data bus 32 to microprosessor 28. Microprocessor 28 then acts on the information from central controller 38 as detailed previously.

In a like manner, information from microprocessor 28 is provided to central controller 38 via data bus 32, UART I 52, second modem 62, line driver component 61, central modem 58 and central UART 56.

Referring now to FIGS. 5 to 9, a detailed description of certain of the present components discussed above is as follows.

Microprocessor 28 shown in FIG. 5 may be a conventional microprocessor, such as Model 1802 manufactured by RCA Corporation. Microprocessor 28 uses crystal 102 and resistor 104 as a resonance circuit to determine clock speed thereby controlling the speed and timing of the entire system. Continuous square wave output TPB from microprocessor 28 is fed, via line 106 to integrated circuit 108 which divides the frequency of TPB by 256. The output from integrated circuit 108 drives integrated circuit 110, via line 112, which divides another 256 times to give a total of 65,536 divisions. The output from integrated circuit 112 is passed to connector 114, via line 116, from which it is made available to decoder-driver device 34 and display unit 36.

Eight (8) data lines, designated $D_0$ through $D_7$, in data bus 32, and eight (8) address lines, designated $A_0$ through $A_7$, in address bus 118 are routed directly to memory 30 through connector 120. Outputs N1, N2 and N3 from microprocessor 28 are provided in response to specific instructions from microprocessor 28. Outputs N1, N2 and N3 are directed to output select 54 which, in turn, acts to decode these outputs N1, N2 and N3 so that the desired component of the system is enabled to communicate with microprocessor 28, The N1, N2 and N3 outputs are binarily encoded as transmitted by microprocessor 28. In integrated circuits 122, 124 and 126, which are components of output select 54, outputs N1, N2 and N3 are decoded, and conditioned. In addition, TPB, a timing pulse generated high by microprocessor 28 at the end of every machine cycle is included with the outputs from integrated circuit 122. The result is that six (6) outputs, designated DN1 through DN6 leave output select 54 to various components of the system as shown in FIG. 5. In this manner, only the desired component is enabled to communicate with microprocessor 28 as dictated by N1, N2, N3 and TPB.

Page select latch 48 and reed select latch 50 are also shown in FIG. 5. These latches 48 and 50, e.g., conventional integrated circuits, receive information from microprocessor 28 via data bus 32. The information is strobed by output DN1 for reed select latch 50 and by output DN2 for reed select latch 48. The information strobed into latches 48 and 50 is the address of the next reed switch 26 to be examined. This information is then sent to decoder board 55 through connector 128.

UART I 52, e.g., a conventional universal asynchronous receiver transmitter such as Model 1854 manufactured by RCA Corporation, is enabled by microprocessor 28 through a "Q" output sent via "Q" line 130. The "Q" output is controllable, e.g., by instructions from microprocessor 28, to either a high logic level or a low logic level independent of system status. The "Q" output is used by output select 54 to disable every other output circuit when microprocessor 28 is communicating with UART I 52. Output signals from UART I 52 are sent to second modem 62 for further processing as indicated elsewhere herein. First and second modems 58 and 62, as well as UART I 52 and central UART 56 may all involve conventional state of the art serial transmission devices and, therefore, will not be described in detail.

Referring now to FIG. 6, integrated circuits 202, 204 and 206 work together to form the memory select logic of memory 30. Integrated circuit 202 is a data latch which is clocked by TPA, a signal generated by microprocessor 28. On the negative transition of TPA, high order address information, from address bus 118, is stored by integrated circuit 202. High order address information, as well as low order address information which is maintained continuously during a memory fetch instruction, is decoded by integrated circuits 204 and 206 into demultiplexed memory select signals, designated DM1 through DM5 and used to select the desired memory device, as indicated in FIG. 6.

Dip switches 208 and 210 are used, during calibration procedures, to enter field variables, such as tank height and offset. (Offset is a correction factor, e.g., in inches, which is applied to the tank height to take into account any difference between the location of zero tank height and zero liquid level. For example, zero liquid level may be somewhat above or below the point at which zero tank height is determined to be.) Thus, dip switches 208 and 210 facilitate convenient field calibration of reed board 24.

Integrated circuits 212, 214 and 216 act to buffer dip switches 208 and 210 and, thus, to allow information to be output to data bus 32 only when desired, as indicated by output DM3 being a logical zero.

Integrated circuit 218 is an arithmetic routine chip which, when called by microprocessor 28 outputs a signal, designated CE0, which is used to disable integrated circuit 220. Integrated circuit 220 contains program memory and is selected when output DM4 is at a logical zero. Integrated circuits 222 and 224 contain random access memory and store intermediate data generated by microprocessor 28. As shown in FIG. 6, integrated circuits 222 and 224 are individually selected when outputs DM5 and DM1, respectively, are at a logical zero.

Referring now to FIG. 7, the functioning of decoder board 55 is illustrated in detail. For purposes of this illustration, the following configuration of reed switches 26 is given. Individual reed switches 26 are mechanically mounted in a linear fashion on reed board 24 with a vertical spacing between switches 26 of 0.25 inch. A total of 4096 reed switches 26 are mounted on reed board 24. The reed switches 26 are divided into four (4) sections each having 1024 reed switches 26 and each section is divided into four pages, with each page containing 256 reed switches 26. Each page includes two groups of 128 reed switches 26 and each group includes eight (8) sub-groups of 16 reed switches apiece.

In FIG. 7, section jumpers 302, 304, 306 and 308 are all associated with conventional integrated circuit 310. Only one of section jumpers 302, 304, 306 and 308 are activated at any time. Thus, if section jumper 302 or 304 or 306 or 308 is activated, in response to information supplied via connector 128, decoder board 55 will address only the upper section or upper middle section or lower middle section or lower section, respectively of reed switches 26. Integrated circuit 310 outputs signals to page jumpers 312, 314, 316 and 318 to activate the desired one of such page jumpers 312, 314, 316 and 318. If page jumper 312 or 314 or 316 or 318 is activated, decoder board 55 will address the upper page or upper middle page or lower middle page or lower page, respectively of the chosen section of reed switches 26. The desired one of group jumpers 320 and 322 is selected, in response to information supplied via connector 128. Again, if the group jumper 320 is activated the upper 128 reed switches 26 of the selected page will be addressed. If, on the other hand, group jumper 322 is activated, the lower 128 reed switches 26 of the selected page will be addressed.

Within each group of reed switches 26 are eight (8) sub-groups each containing 16 individual reed switches 26. Conventional integrated circuits 324, 326 and 328 route information on the status of individual reed switches 26 to microprocessor 28 via connector 128. For example, each of integrated circuits 324, 326 and 328 may be a CMOS Model 4051 integrated circuit.

Integrated circuits 324, 326 and 328 function as follows. A logic signal is routed through integrated circuit 326, from group jumper 320 or 322, to "enable" a sub-group of 16 individual reed switches 26, that is to cause an electrical potential to be placed on one side of each of said sub-group of reed switches 26. The signal from integrated circuit 326 is transmitted through a closed switch 26 or is terminated by an open switch 26. If this signal is terminated, microprocessor 28 receives a logical zero. If the signal is transmitted through a closed reed switch 26, a logical high level will be generated on one of the input pins of integrated circuit 324 or 328. Output pins from integrated circuits 324 and 328 are tied together and are common, via connector 128, with an input pin on microprocessor 28. A signal, designated EFI, transports information from decoder board 55 to microprocessor 28. See FIG. 5. Conventional integrated circuit 330 insures that the proper group address is being received by decoder board 55 that only integrated circuit 324 or 328 is transmitting data to microprocessor 28 at any given time.

Referring now to FIG. 8, connector 114 passes decoded signals DN3, DN4 and DN5 to integrated circuit 402 which acts to invert such signals to conform to input strobe requirements of integrated circuits 404, 406, 408, 410, 412 and 414, which integrated circuits make up decoder-driver device 34. Integrated circuits 404, 406, 408, 410, 412 and 416 receive input data from data bus 32 as shown in FIG. 8. Four (4) lines of data, out of the eight (8) lines available, for each of the integrated circuits 404, 406, 408, 410, 412 and 414 and, therefore, information for two of these circuits is strobed simultaneously. Integrated circuits 404 and 406 are strobed by $\overline{DN3}$; integrated circuits 408 and 410 are strobed by $\overline{DN4}$; and integrated circuits 412 and 414 are strobed by $\overline{DN5}$. The latched information is decoded within the individual integrated circuit 404, 406, 408, 410, 412 or 414, and used to drive conventional display unit 36, for example, a 7-segment Liquid Crystal Display (LCD) unit. As can be seen in FIG. 8, integrated circuits 404 and 406 handle information regarding "feet" of liquid level, circuits 408 and 410 handle information regarding "inches" of liquid level, and circuits 412 and 414 handle information regarding 16th's of inches of liquid level. Integrated circuit 110 (in FIG. 5) acts through connector 114 as a low frequency clock to modulate the outputs of integrated circuits 404, 406, 408, 410, 412 and 414.

Referring now to FIG. 9, data to be output to control, e.g., alter, level change means, e.g., pumps, valves and the like, is received from microprocessor 28 via data bus 32 and connector 502 and is latched into integrated circuit 504. Information regarding the desired status of up to eight (8) outputs is output on pins $Q_1$ through $Q_8$ of integrated circuit 504. The information is buffered by individual output buffers 506 and 508. (While up to eight (8) output buffers are possible—one for each "Q" output—only two are shown in FIG. 9.) Output buffers 506 and 508 act to current amplify the respective "Q" outputs sufficiently to drive relays, and other output devices as necessary. The status of these outputs can be changed or adjusted only when signal DN6 from output select 54 is brought low. The signals from output buffers, e.g. 506 and 508 are sent to the field to change the status of, for example, valve solenoids, pump starters and the like as shown in FIG. 9. In this manner, the present system can act to change, and therefore control, the liquid level, e.g., in storage tank 10.

Status information from the field is first filtered in noise filters 510 and 512 (up to eight (8) filters are possible, with only two being shown in FIG. 9), from which it is passed to input buffer 514, e.g., a conventional integrated circuit. The input information from input buffer 514 is communicated to microprocessor 28 via data bus 32 only when the output enable pin of input buffer 514 is brought low. Input port decoder 514 (a conventional integrated circuit) continuously polls the inverted MRD signal, i.e., $\overline{\text{MRD}}$ signal, and the N1 signal from microprocessor 28. These signals are controlled in response to instructions from microprocessor 28. When the $\overline{\text{MRD}}$ signal is brought low and N1 is high, the output enable pin of input buffer 514 is brought low. At this point, the field status of valves, pumps and the like may be passed via data bus 32 to memory 30 or such information may be sent directly to central controller 38 and CRT display device 42.

Temperature sensing is performed as follows. Temperature sensing transducer 518 is immersed in the liquid 18 in liquid storage tank 10. Transducer 518 outputs a current proportional to the liquid temperature. This current is converted into a voltage by conventional converter 520. A/D converter 522 converts the output of converter 520 into a linearly decoded signal representing the temperature of the liquid 18 in tank 10. This temperature information is communicated to microprocessor 28 via data bus 32 only when the output enable pin of A/D converter is brought low. Temperature input decoder 524 continuously polls $\overline{\text{MRD}}$ and N2 signals from microprocessor 28. When $\overline{\text{MRD}}$ is low and N2 is high, the output enable pin of A/D converter 522 is brought low and A/D converter 522 transmits its temperature information via data bus 32 to microprocessor 28 from which it may be stored in memory 30 or transmitted directly to central controller 38 and CRT display 42.

The present system is seen to provide unexpectedly effective, reliable, relatively maintenance-free and inexpensive monitoring of liquid storage tank operation. Liquid level and temperature are continuously monitored and displayed without requiring any continuing human assistance. Information regarding the present status of various pumps, valves and the like components associated with the tank is also obtained and can be used to control the liquid level in the tank within a safe range. A plurality of storage tanks may be monitored and/or controlled using the present system with each tank, for example, being governed by independently specified control, e.g., liquid level control, criteria.

Moreover, the information collected from one tank can be conveniently transmitted to a central location for monitoring and/or control purpose. Very simple electrical connections provide information between the tank and the central location. In addition, instructions regarding altering the status of pumps, valves and the like can be given at the central location and communicated to and implemented by the system directly associated with the tank in question. A great many tanks may be monitored and/or controlled from a central location in a very convenient manner.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. An apparatus for determining the level of liquid in a vessel containing liquid which comprises:
   (1) a plurality of indicator means located at varying points along the height of said vessel, each said indicator means being capable of acting to indicate the presence of liquid at a predetermined level within said vessel;
   (2) control means in association with said indicator means to independently periodically send first signals to each of said indicator means to determine whether any given indicator means gives a positive indication of the presence of liquid at a given level within said vessel, said control means further being capable of acting to receive second signals from said indicator means indicating the presence or absence of liquid at a given level within said vessel, said second signals being translatable by said control means into third signals representing the height of said liquid level in said vessel, said control means still further acting to independently send selected second signals which indicate the presence of the liquid level at a given level within said vessel, said third signals or both said selected second and third signals to memory means, hereinafter described;
   (3) memory means in association with said control means acting to receive said selected second signals, said third signals, or both said selected second and third signals from said control means and store said received signals for future use; and
   (4) display means in association with said control means and acting in response to said control means to periodically receive said received signals from said memory means and said control means and provide a visual display of the height of said liquid level in said vessel.

2. The apparatus of claim 1 wherein said received signals are third signals and are sent by said memory means and received by said control means, and said display means periodically receives said third signals from said control means.

3. The apparatus of claim 1 further comprising: (5) central monitoring means in association with said control means and being capable of receiving third signals from a plurality of control means and providing a visual display of the height of liquid level in a plurality of vessels containing liquid.

4. The apparatus of claim 3 further comprising a plurality of sets of components (1), (2), (3) and (4), each said component set being associated with a different vessel containing liquid.

5. The apparatus of claim 4 further comprising interrupt means associated with each of said control means and said central monitoring means and acting to interrupt, as desired, said sending of said first signals to allow said individual control means to send said third signals to said central monitoring means.

6. The apparatus of any of claims 1, 3 or 5 wherein each said indicator means comprises a magnetic reed switch which is activated in response to a magnetic float at or near the surface of said liquid in said vessel.

7. The apparatus of claim 1 wherein said vessel is equipped with level change means capable of changing the level of liquid in said vessel, said control means still further being capable of sending fourth signals to said level change means to control said level change means so that said liquid level in said vessel is maintained within or adjusted to a predetermined range, said fourth signals normally being sent by said control means in response to said liquid level in said vessel determined by said control means from said second signals, said control means additionally being capable of periodically receiving fifth signals from said level change means which are translatable by said control means into sixth signals representing the status of said level change means, said memory means further acting to receive and store for future use said fifth signals, said sixth signals or both.

8. The apparatus of claim 7 further comprising: (5) central monitoring means in association with said control means and being capable of receiving third signals and sixth signals from a plurality of control means and providing a visual display of the height of liquid level in a plurality of vessels containing liquid and the status of the level change means of said plurality of vessels containing liquid.

9. The apparatus of claim 8 further comprising interrupt means associated with said control means and said central monitoring means and acting to interrupt, as desired, said sending of said first and fourth signals and receiving of said second and fifth signals by said control means to allow said control means to send said third and sixth signals to said central monitoring means.

10. The apparatus of any of the claims 8 or 9 wherein said central monitoring means includes override means being capable of acting in response to manual instruction to send seventh signals to said control means to cause said control means to send fourth signals to said level change means in response to said seventh signals to alter the status of said level change means.

11. The apparatus of claim 1 wherein said liquid storage tank is equipped with temperature measuring means capable of measuring the temperature of the liquid in said vessel, said control means additionally being capable of periodically requesting and receiving first temperature signals from said temperature measuring means which are translatable by said control means into second temperature signals representing the temperature of the liquid in said vessel, said memory means still further acting to receive and store for future use said first temperature signals, said second temperature signals or both, and said display means further acting in response to said control means to receive said second temperature signals from said control means or said memory means and provide a visual display of the temperature of the liquid in said vessel.

12. The apparatus of claim 7 wherein said vessel is equipped with temperature measuring means capable of measuring the temperature of the liquid in said vessel, said control means additionally being capable of periodically requesting and receiving first temperature signals from said temperature measuring means which are translatable by said control means into second temperature signals representing the temperature of the liquid in said vessel, said memory means still further acting to receive and store for future use said first temperature signals, said second temperature signals or both, and said display means further acting in response to said control means to receive said second temperature signals from said control means or said memory means and provide a visual display of the temperature of the liquid in said vessel.

13. The apparatus of claim 11 further comprising: (5) central monitoring means in association with said control means and being capable of receiving third signals from a plurality of control means and providing a visual display of the height of liquid level in a plurality of vessels containing liquid, said central monitoring means further being capable of receiving second temperature signals from a plurality of control means and providing a visual display of the temperature of the liquid in a plurality of vessels containing liquid.

14. The apparatus of claim 11 further comprising: (5) central monitoring means in association with said control means and being capable of receiving third signals and sixth signals from a plurality of control means and providing a visual display of the height of liquid level in a plurality of vessels containing liquid and the status of the level change means of said plurality of vessels containing liquid, said central monitoring means further being capable of receiving second temperature signals from a plurality of control means and providing a visual display of the temperature of the liquid in a plurality of vessels containing liquid.

15. The apparatus of claim 13 further comprising interrupt means associated with said control means and said central monitoring means and acting to interrupt, as desired, said sending of said first signals, said receiving of said second signals and said requesting and receiving of said first temperature signals by said control means to allow said control means to send said third signals and said second temperature conditions to said central monitoring means.

16. The apparatus of claim 14 further comprising interrupt means associated with said control means and said central monitoring means and acting to interrupt, as desired, said sending of said first and fourth signals, said receiving of said second and fifth signals, and said requesting and receiving of said first temperature signals by said control means to allow said control means to send said third, sixth and second temperature signals to said central monitoring means.

17. The apparatus of any of the claims 1, 7 or 11 wherein said control means comprises a microprocessor.

* * * * *